Patented Oct. 23, 1951

2,572,000

UNITED STATES PATENT OFFICE 2,572,000

ADDITIVES FOR HYDROCARBON OILS

John D. Bartleson, East Cleveland, Ohio, assignor to The Standard Oil Company, Cleveland, Ohio, a corporation of Ohio No Drawing. Application December 31, 1948,
Serial No. 68,721

15 Claims. (Cl. 252—46.7)

The present invention relates to a novel group of additives for stabilizing normally non-volatile hydrocarbon products such as lubricating oils, and to lubricating oils containing such additives.

Many additives have hitherto been suggested in the petroleum art and most, if not all of them, are designed with a view to preventing deterioration of the hydrocarbon products to which they are added. Generally these additives are designated as "anti-oxidants" or oxidation inhibitors. Some of these additives are expensive, others are soluble in hydrocarbon oils in only extremely small amounts and still others exert a stabilizing effect on oils only at the expense, however, of introducing some undesirable result, such as increasing their corrosiveness. Some of the so-called anti-oxidants are quite efficient in preventing the formation of sludge in oils under ordinary conditions, but when the oils containing them are brought into contact with volatile hydrocarbon products such as gasoline they have a tendency to form sludge. This is believed to be the reason for the well known fact that the cylinder walls and piston skirts in automobile engines acquire considerable lacquer even when operated with oils containing some of the better known anti-oxidants such as phosphorus sulfides.

It has been proposed, for example, to add to lubricating oils anti-oxidants such as phosphorus sulfides alone or in combination with organic amines also known to have anti-oxidant properties. It has been stated that when a phosphorus sulfide and an organic amine are combined, they have a synergistic action that gives an effect which is greater than the additive action of the two alone.

It has now been found that the reaction products of ammonia with phosphorus compounds, wherein the phosphorus is in chemical combination with a member of the sulfur family, inhibit to a marked degree the formation of sludge in an oil when it is brought into contact with gasoline at relatively high temperatures, such as is the case with a lubricating oil used in an internal combustion engine.

This is to be distinguished from previous proposals to add phosphorus sulfides and organic amines inasmuch as ammonia, unlike the amines, is not recognized to have any anti-oxidant properties.

It has also been found that this class of additives is soluble in substantially all proportions in normally non-volatile hydrocarbon products such as lubricating oils.

More specifically, the additive of the present invention is defined as a reaction product of ammonia with a compound having the general formula $P_4X_3$ wherein X is a member of the sulfur family, i. e., sulfur, selenium and tellurium. $P_4S_3$ is preferred, largely due to its lower cost, as the initial phosphorus-containing component. However, compounds of phosphorus with other members of the sulfur family, particularly $P_4Se_3$, are also effective and may be used. The phosphorus-containing component used is the commercial grade and this may contain some impurities.

Generally the additives of this invention are prepared by bringing the phosphorus-containing component into contact with gaseous ammonia. This can be accomplished either by blowing the phosphorus-containing component, in its solid form, with ammonia gas or by dissolving or dispersing the phosphorus-containing component in a hydrocarbon oil and then blowing the oil with ammonia gas preferably while maintaining it in an inert, i. e., non-oxidizing, atmosphere.

The term "dispersing" as used herein, is generic to and includes within its scope the act of dispersing or suspending as well as of forming a true solution.

If the additive is prepared by blowing ammonia gas through the phosphorus-containing component in its solid state, the operation may be carried out at room temperature and the only precaution required, if the operation is carried out in the presence of air, is to maintain the temperature at a level below the temperature at which the phosphorus-containing component will ignite spontaneously. When commercial $P_4S_3$ is used as the initial phosphorus-containing component, the operation should therefore be carried out at a temperature below 212° F. if air is allowed to be present.

If the additive is prepared in the presence of oil, the phosphorus-containing component is first added to the oil and dissolved or dispersed therein. A well diffused stream of ammonia gas is then blown through the oil while the oil is maintained at an elevated temperature and under atmospheric or super-atmospheric pressure. Generally speaking, the severity of the temperature and pressure conditions increases with an increase in the concentration of the phosphorus-containing component in the oil. Thus, for example, it has been found that a temperature of 200° F. and atmospheric pressure are ample when the concentration of the phosphorus-containing component in the oil is of the order of 0.025 to 0.20% by weight and that temperatures of the order of 300° F. at atmospheric pressure are required when the concentration of the phosphorus-containing component in the oil is of the order of 10 to 15% by weight. Oil pastes containing as high as 50% by weight of the phosphorus-containing component may be blown with ammonia while they are under super-atmospheric pressure and, if desired, at still higher temperatures.

It has been found that the additives of this invention are stable to storage whether they be prepared by blowing gaseous ammonia through the solid phosphorus-containing component or through an oil having any desired concentration of said component dissolved or suspended therein. It has also been found that the treatment of the phosphorus-containing component with ammonia results in a very significant decrease in the amount of sludge formed when oils containing the additives of this invention are brought into contact with gasoline at an elevated temperature. This is true whether the additive is made in the presence or absence of the oil in which it is to be used. These findings lead to the conclusion that a reaction takes place between the ammonia and the phosphorus-containing component.

Oils containing from about 0.025% to about 0.2% by weight of the additive, based on the weight of the sulfur-containing component have been found particularly suitable as lubricating oils in internal combustion engines and oils containing between about 1 and 2.5% by weight are characterized by excellent extreme pressure properties. Optimum concentrations are 0.10%, plus or minus 0.05%, for lubricating oils and about 1.25% to 2% for gear oils.

One of the outsanding advantages of the present invention, therefore, is that it provides a class of additives which may be prepared in concentrated form and which may be blended with untreated oils. This avoids the necessity of subjecting large volumes of oil to special treatment for the purpose of inhibiting their tendency to form sludge. These and other advantages will become more apparent from the more detailed disclosure that follows.

A gasoline sludge deposit test was used to evaluate the tendency of various samples of oil to form a sludge when they come into contact with gasoline at an elevated temperature. In this test, 150 grams of an oil sample and 50 cc. of gasoline, in the form of thermally cracked debutanized gasoline, are placed in a test tube having a capacity of 350 cc. A glass bubbler supporting a steel sleeve of 100 sq. cm. area is then inserted into the tube. Moist air is blown through the bubbler at a rate of 70 liters per hour for five hours, the entire apparatus and contents being maintained at a temperature of 280° F. When this operation is concluded, the apparatus and contents are allowed to cool. The oil and gasoline mixture is filtered through a weighed filter paper, the test tube, bubbler and sludge cake are washed with pentane to remove any oil, and the sludge obtained is weighed accurately to 0.1 mgm.

Example 1

3% by weight of $P_4S_3$ was added to an acid treated lubricating petroleum oil stock having a viscosity of 227.2 SUS at 100° F. and referred to by the trade name #225 Red Oil, the oil being maintained at a temperature of 200° F. for 30 minutes while stirring. Anhydrous ammonia gas was then bubbled through the oil in the form of very fine bubbles by introducing it through a diffuser plate while the oil was maintained at 200° F. and the oil was thoroughly stirred. The amount of ammonia thus bubbled through the oil was in excess of the requirements, 0.05 to 0.20% by weight being sufficient. After cooling to room temperature, part of the $P_4S_3$ settled out in fine crystals which were readily dispersed in the oil with mild shaking to what appeared to be a homogeneous mixture. This suspension, when added to an oil so as to contain 0.10% by weight, based on the $P_4S_3$, in an oil consisting of 84 parts by weight of #225 Red Oil, 12½ parts by weight of a Pennsylvania bright stock and 3.5 parts by weight of "Paratone" (a polyisobutylene viscosity index improver), formed a clear oil solution at room temperature.

A sample of this oil and a sample of a similar oil containing an equal concentration of $P_4S_3$ not reacted with ammonia were subjected to the gasoline sludge test.

It was found that the sample containing 0.1% by weight of $P_4S_3$ that had not been contacted with ammonia formed 0.2761 gram of sludge and that the sample containing 0.1% by weight of $P_4S_3$ reacted with ammonia formed only 0.0610 gram of sludge, thus showing that the ammonia treatment resulted in a 77.8% reduction in the amount of sludge formed.

Example 2

0.15% by weight of fresh $P_4S_3$ was added to a quantity of #225 Red Oil heated to 200° F. and stirred for one hour at this temperature. At the end of this period, an excess of anhydrous ammonia in gaseous form was bubbled through the oil through a diffuser plate to give very fine bubbles, the temperature still being maintained at about 200° F.

After the ammonia was added, the oil was blown with air for from 15 to 60 minutes and thus stirred to remove excess ammonia and the odor of ammonia from the oil. The oil was then filtered through a blotter-type filter press without the use of a filter aid. 84 parts by weight of the filtrate, which was about as light in color as the original neutral oil, were then blended with 12.5 parts by weight of Pennsylvania bright stock and 3.5 parts by weight of "Paratone," thus reducing the concentration of the additive in the final oil to 0.126% by weight based on the $P_4S_3$.

The results of the gasoline sludge test made with a 150 gram sample of this oil and of a similar sample containing 0.126% by weight of $P_4S_3$ not subjected to the ammonia treatment were comparable to those of Example 1.

Example 3

10 parts by weight of $P_4S_3$ and 90 parts by weight of #300 Red Oil, a lubricating petroleum oil stock having a viscosity of 300 SUS at 100° F., were heated with stirring in a nitrogen atmosphere to 300° F. At this temperature, the $P_4S_3$ was observed to be completely dissolved.

While the $P_4S_3$ containing oil was maintained at 300° F., an excess of anhydrous ammonia gas was blown through the oil in the same manner as described in Example 1. No solid was precipitated. On cooling, however, $P_4S_3$ separated but could readily be shaken with the oil to form a homogeneous suspension.

The concentrate thus formed was blended with a mixture consisting of 84 parts by weight of

225 Red Oil, 12.5 parts by weight of Pennsylvania bright stock and 3.5 parts by weight of "Paratone" in an amount to obtain a concentration of 0.2% by weight of $P_4S_3$.

150 grams of the oil thus prepared were subjected to the gasoline sludge test and the results thereof were compared with those obtained by subjecting the same oil containing 0.2% by weight of $P_4S_3$ not treated with ammonia to the same test.

It was found that the oil containing 0.2% by weight of untreated $P_4S_3$ formed 0.3275 gram of sludge and that the oil containing 0.2% by weight of $P_4S_3$ treated with ammonia formed only 0.1416 gram of sludge, thus indicating that, in this instance, the amount of sludge has been reduced 56.8% by the ammonia treatment.

*Example 4*

50 parts by weight of $P_4S_3$ and 50 parts by weight of an oil were made into a paste by grinding the components in a ball mill in an inert atmosphere. This paste was divided into four aliquot portions identified herein as pastes 1, 2, 3 and 4.

Pastes 2–4 were then blown with anhydrous ammonia gas. These pastes were found to be homogeneous suspensions upon shaking at room temperature.

Paste #2 was subjected to washing with water.

Pastes 1–4 were each blended with an oil consisting of 84 parts of #225 Red Oil, 12.5 parts by weight of Pennsylvania bright stock and 3.5 parts of "Paratone" in amounts sufficient to form a concentration therein of 0.126% $P_4S_3$.

The oil obtained with paste #3 was then blown with a further quantity of anhydrous ammonia gas.

The four samples of oil thus obtained were each subjected to the gasoline sludge test. The results are tabulated below:

| Oil formed with Paste No. — | Amount of Sludge, in Grams |
| --- | --- |
| 1 | 0.1295 |
| 2 | 0.0945 |
| 3 | 0.0340 |
| 4 | 0.0882 |

It is immediately apparent from the foregoing results that the oil samples containing $P_4S_3$ reacted with ammonia form considerably less sludge than the oil containing unreacted $P_4S_3$. The much lower amount of sludge obtained with oil #3 is apparently due to the fact that pastes #2 and #4 had not been blown sufficiently with ammonia gas.

*Example 5*

A reaction product of $P_4S_3$ and ammonia was prepared simply by blowing a quantity of solid $P_4S_3$ with an anhydrous ammonia gas for one hour at room temperature.

The reaction product so produced was dissolved in a commercial SAE 20 lubricating oil to a concentration of 0.126% $P_4S_3$.

A sample of oil thus prepared was subjected to the gasoline sludge test and the results thereof compared with those obtained by subjecting the same oil but containing 0.126% $P_4S_3$ unreacted with ammonia. It was found the oil containing unreacted $P_4S_3$ formed 0.2145 gram of sludge and that the oil formed in accordance with this example formed only 0.0677 gram of sludge, thus indicating that the ammonia treatment had reduced the amount of sludge formed by 68.3%.

*Example 6*

A 50—50 mixture of SAE 10 and SAE 50 furfural extracted oils having a viscosity of 462 SUS at 100° F., 61 SUS at 210° F., a viscosity index of 94.3 and an API gravity of 30.3 was treated with 0.1% by weight of $P_4S_3$ and with ammonia in the same manner as described in Example 2. The oil thus obtained was subjected to the gasoline sludge test and the results thereof compared with those obtained by subjecting the same oil but containing 0.1% by weight of $P_4S_3$ unreacted with ammonia to the same test. It was found that the oil containing 0.1% by weight of $P_4S_3$ reacted with ammonia formed 0.0860 gram of sludge and that the oil containing 0.1% unreacted $P_4S_3$ formed 0.3595 gram of sludge, thus showing that the treatment of the $P_4S_3$ with ammonia had reduced the sludge formation by 76.1%.

*Example 7*

$P_4Se_3$ was added to an oil in an amount sufficient to form a concentration of 0.126% by weight. A portion of this oil was then treated with ammonia gas in the manner described in Example 1.

A sample of each of the oils thus obtained was subjected to the gasoline sludge test and it was found that the sample containing 0.126% by weight of $P_4Se_3$ treated with ammonia formed 0.0615 gram of sludge whereas the sample containing 0.126% by weight of unreacted $P_4Se_3$ formed 0.2264 gram of sludge, thus indicating that the treatment with ammonia had reduced the sludge forming tendency by 72.8%.

*Example 8*

84 parts of #225 Red Oil were treated with 0.1% by weight of $P_4S_3$ and blown with anhydrous ammonia gas in substantially the same manner as described in Example 2. 12.5 parts of Pennsylvania bright stock and 3.5 parts of "Paratone" were then added to result in an oil having a concentration of additive amounting to 0.084% by weight, based on the weight of the $P_4S_3$. This oil was then subjected to the standard 36 hour L-4 Chevrolet engine test.

In this test, the engine is a conventional Chevrolet engine with 216.5 cu. in. piston displacement and a compression ratio of 6.5 to 1. New piston rings and two new copper-lead bearing inserts are installed in the engine prior to each test.

The engine is operated at 3150 R. P. M. with a load of 30 B. H. P. and at a temperature at the jacket outlet of 200° F. The temperature of the lubricating oil is maintained at 265° F. The fuel contains from 2.5 to 3.0 cc. tetraethyl lead per gallon.

At the conclusion of the test run, the total varnish rating was determined by visual inspection of the piston skirts, rocker arm cover plate, push rod cover plate, cylinder walls and crankcase oil pan; the overall sludge rating was determined by inspection of the rocker arm assembly, rocker arm cover plate, oil screen, and crankcase oil pan; the bearing corrosion was determined by comparing the before and after weights, in milligrams, of the new bearing inserts; and the properties of the used oil were examined.

The following results were obtained:

| | |
|---|---|
| Total varnish rating | 44.75 |
| Piston skirt varnish rating | 8.00 |
| Total sludge rating | 46.50 |
| Overall rating | 91.25 |
| Bearing corrosion (mgms./bearing half-shell) | 58 |
| Used oil properties: | |
|    Viscosity increase (SUS) | 92 |
|    Pentane insolubles (in per cent by wt. of the oil) | 1.77 |
|    Benzene insolubles (in per cent by wt. of the oil) | 1.20 |

These results show that an oil containing an additive typical of those within the scope of this invention has an excellent overall rating, desirably low corrosion and very good used oil properties.

*Example 9*

Two oils were subjected to the standard 36 hour Chevrolet engine test described in Example 8.

Oil No. 1 was prepared by adding the 3% concentrate obtained in accordance with Example 1 to a further quantity of an SAE 20 lubricating oil until the concentration of the additive became 0.126% by weight based on the weight of the $P_4S_3$. Oil No. 2 was identical with that of Example 2.

The results were as follows:

| | No. 1 | No. 2 |
|---|---|---|
| Total Varnish Rating | 42.50 | 42.50 |
| Piston Skirt Varnish Rating | 6.50 | 6.50 |
| Total Sludge Rating | 42.75 | 44.00 |
| Overall Rating | 85.25 | 86.50 |
| Bearing Corrosion (mgms./bearing half-shell) | 27 | 72 |
| Used Oil Properties: | | |
|   Viscosity Increase (SUS) | 95 | 89 |
|   Pentane Insolubles (in percent by wt. of the oil) | 1.38 | 2.15 |
|   Benzene Insolubles (in per cent by wt. of the oil) | 0.74 | 1.45 |

These results show that it makes little difference whether the additive is prepared in concentrated form and then added to untreated oil or the entire amount of lubricating oil is treated directly and that both oils have excellent overall ratings, desirably low corrosion and very good used oil properties.

*Example 10*

The oil obtained as described in Example 6 was subjected to two modified FL-2 engine tests, which are the same as the L-4 Chevrolet engine test described in Example 8 except that one was run for 20 hours, the other was run for 40 hours, and in both tests the engine is operated at 2100 R. P. M. with a load of 40 B. H. P. The temperature at the jacket outlet of the cooling system and the temperature of lubricating oil are maintained at 155–160° F. and 170° F., respectively, and the air-fuel ratio is maintained at 14.5 to 1.

The following results were obtained:

| | 20 Hours | 40 Hours |
|---|---|---|
| Total Varnish Rating | 45.25 | 43.25 |
| Piston Skirt Varnish Rating | 8.25 | 8.00 |
| Total Sludge Rating | 48.00 | 46.75 |
| Overall Rating | 93.00 | 90.00 |

These results show that solvent extracted oils containing an additive typical of those within the scope of this invention possess excellent varnish and sludge ratings.

*Example 11*

Eight 107 cc. samples of a standard SAE 20 lubricating oil were subjected to a 20 hour Sohio Corrosion Test conducted at a temperature of 325° F.

Sample No. 1 contained 0.126% by weight, based on the $P_4S_3$, of the additive as prepared in Example 1; sample No. 2 contained the same concentration of the additive but was prepared as described in Example 2; samples Nos. 3 and 4 each contained 0.126% by weight of the $P_4S_3$-$NH_3$ additive formed from pastes 2 and 4, respectively, of Example 4; samples 5 and 6 each contained 0.084% and 0.168% by weight, respectively, of the $P_4Se_3$-$NH_3$ additive described in Example 7; samples 7 and 8 each contained 0.084% and 0.168% by weight, respectively, of $P_4Se_3$ not treated with ammonia; and sample No. 9 contained no additive.

The Sohio Corrosion Test is described in U. S. Patent No. 2,464,233 granted March 15, 1949, to E. C. Hughes, J. D. Bartleson, M. L. Sunday and M. M. Fink and is used because of the correlation of the test results obtained with a 72 hour Chevrolet engine test.

The results were as follows:

| Lubricant (Sample No.) | 1 | 2 | 3 | 4 | 5 | 6 | 7 | 8 | 9 |
|---|---|---|---|---|---|---|---|---|---|
| Corrosion of Cu-Pb (in mgs. lost) | 5.83 | 3.4 | 5.9 | 6.0 | 15.9 | 54.9 | 41.2 | 24.3 | 151.8 |
| Viscosity Increase (SUS) | 68 | 114 | 101 | 87 | 250 | 59 | 171 | 113 | 1,390 |
| Pentane Insolubles (in per cent by wt. of lubricant) | 1.02 | 0.76 | 0.89 | 0.89 | 2.17 | 0.69 | 1.92 | 0.84 | 13.95 |
| Sludge Rating | A | A | A | A | A– | A | A | A | E |
| Lacquer Rating | A | A | A | A | B | A– | A | A | D |

These results show that the additives of this invention impart superior corrosion, viscosity, sludge and lacquer characteristics to a standard SAE 20 lubricating oil.

*Example 12*

Five samples of an SAE 50 acid-refined Mid-Continent oil were subjected to the standard Timkin test to determine their extreme pressure characteristics.

Sample No. 1 contained no additive; sample No. 2 contained 1.25% by weight of $P_4S_3$ not treated with ammonia; samples Nos. 3 and 4 contained 1.25% and 2.0% by weight, respectively, of $P_4S_3$ treated with ammonia; and sample No. 5 contained 0.25% by weight of $P_4Se_3$ treated with ammonia.

The results were as follows:

| Sample No. | Timken Test Rating in lbs. |
|---|---|
| 1 | 20 |
| 2 | 35 |
| 3 | 40 |
| 4 | 45 |
| 5 | 33 |

These results show that the additives of this invention are effective in imparting excellent extreme pressure characteristics to oils to make them eminently suitable as gear oils.

It is to be understood that the invention is not to be limited to the specific examples disclosed herein but that it includes all such modifications and changes as come within the scope of the appended claims.

1. A reaction product of ammonia with a compound having the general formula $P_4X_3$ wherein X stands for a member of the sulfur family, said reaction product being obtained by blowing ammonia gas through the phosphorus compound and being suitable as an anti-oxidant and anti-sludge additive for mineral lubricating oils.

2. A reaction product of ammonia with $P_4S_3$, said reaction product being obtained by blowing ammonia gas through the $P_4S_3$ and being suitable as an anti-oxidant and anti-sludge additive for mineral lubricating oils.

3. A reaction product of ammonia with $P_4Se_3$, said reaction product being obtained by blowing ammonia gas through the $P_4Se_3$ and being suitable as an anti-oxidant and anti-sludge additive for mineral lubricating oils.

4. A reaction product of ammonia with a compound having the general formula $P_4X_3$ wherein X stands for a member of the sulfur family, said reaction product being obtained by dispersing the phosphorus compound in a mineral oil and blowing an excess of anhydrous ammonia gas through the oil, said reaction product being suitable as an anti-oxidant and anti-sludge additive for mineral lubricating oils.

5. A reaction product of ammonia with $P_4S_3$, said reaction product being obtained by dispersing the phosphorus compound in a mineral oil and blowing an excess of anhydrous ammonia gas through the oil, said reaction product being suitable an an anti-oxidant and anti-sludge additive for mineral lubricating oils.

6. A reaction product of ammonia with $P_4Se_3$, said reaction product being obtained by dispersing the phosphorus compound in a mineral oil and blowing an excess of anhydrous ammonia gas through the oil, said reaction product being suitable as an anti-oxidant and anti-sludge additive for mineral lubricating oils.

7. A normally non-volatile mineral hydrocarbon product containing a reaction product of ammonia in accordance with claim 1.

8. A normally non-volatile mineral hydrocarbon product containing a reaction product in accordance with claim 2.

9. A normally non-volatile mineral hydrocarbon product containing a reaction product in accordance with claim 3.

10. A concentrate suitable as an anti-oxidant and anti-sludge additive for mineral lubricating oils, comprising a mineral oil and a reaction product of ammonia with $P_4X_3$, wherein X stands for a member of the sulfur family, said reaction product being obtained by dispersing in the oil an amount up to about 50% of said phosphorus compound by weight of the oil and then blowing ammonia gas through the oil.

11. A concentrate suitable for use as an anti-oxidant and anti-sludge additive for mineral lubricating oils comprising a mineral oil and a reaction product of ammonia with $P_4S_3$, said reaction product being obtained by dispersing in the oil an amount up to about 50% of said phosphorus compound by weight of the oil and then blowing ammonia gas through the oil.

12. A concentrate suitable for use as an anti-oxidant and anti-sludge additive for mineral lubricating oils comprising a mineral oil and a reaction product of ammonia with $P_4Se_3$, said reaction product being obtained by dispersing in the oil an amount up to about 50% of said phosphorus compound by weight of the oil and then blowing ammonia gas through the oil.

13. A mineral lubricating oil containing an amount of an additive to inhibit the development of oxidative deterioration of said oil and the formation of sludge in service, which additive consists essentially of the reaction product of ammonia with $P_4X_3$ wherein X stands for a member of the sulfur family, said reaction product being formed in situ in said oil by dispersing said phosphorus compound in the oil and then blowing ammonia gas through the oil.

14. A mineral lubricating oil containing an amount of an additive to inhibit the development of oxidative deterioration of said oil and the formation of sludge in service, which additive consists essentially of the reaction product of ammonia with $P_4S_3$, said reaction product being formed in situ in said oil by dispersing said phosphorus compound in the oil and then blowing ammonia gas through the oil.

15. A mineral lubricating oil containing an amount of an additive to inhibit the development of oxidative deterioration of said oil and the formation of sludge in service, which additive consists essentially of the reaction product of ammonia with $P_4Se_3$, said reaction product being formed in situ in said oil by dispersing said phosphorus compound in the oil and then blowing ammonia gas through the oil.

JOHN D. BARTLESON.

No references cited.